United States Patent
Volkov

(10) Patent No.: US 10,721,271 B2
(45) Date of Patent: Jul. 21, 2020

(54) SYSTEM AND METHOD FOR DETECTING PHISHING WEB PAGES

(71) Applicant: TRUST LTD., Moscow (RU)

(72) Inventor: Dmitry Aleksandrovich Volkov, Moscow (RU)

(73) Assignee: TRUST LTD., Moscow (RU)

( * ) Notice: Subject to any disclaimer, the term of this patent is extended or adjusted under 35 U.S.C. 154(b) by 179 days.

(21) Appl. No.: 15/858,013

(22) Filed: Dec. 29, 2017

(65) Prior Publication Data

US 2018/0191777 A1    Jul. 5, 2018

(30) Foreign Application Priority Data

Dec. 29, 2016   (RU) ................................ 2016152427

(51) Int. Cl.
   *H04L 29/06*    (2006.01)
(52) U.S. Cl.
   CPC ...... *H04L 63/1483* (2013.01); *H04L 63/1416* (2013.01)
(58) Field of Classification Search
   CPC ........................ H04L 63/1483; H04L 63/1416
   See application file for complete search history.

(56) References Cited

U.S. PATENT DOCUMENTS

| | | | |
|---|---|---|---|
| 7,225,343 B1 * | 5/2007 | Honig | G06F 21/554 713/194 |
| 7,496,628 B2 | 2/2009 | Arnold et al. | |
| 7,712,136 B2 | 5/2010 | Sprosts et al. | |
| 7,730,040 B2 | 6/2010 | Reasor et al. | |
| 7,865,953 B1 | 1/2011 | Hsieh et al. | |
| 7,958,555 B1 | 6/2011 | Chen et al. | |
| 7,984,500 B1 | 7/2011 | Khanna et al. | |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

English Abstract of RU107616 retrieved on Espacenet on Jul. 3, 2017.

(Continued)

*Primary Examiner* — Joseph P Hirl
*Assistant Examiner* — Stephen T Gundry
(74) *Attorney, Agent, or Firm* — BCF LLP

(57) ABSTRACT

A method for detecting a phishing web page. The method, executable at a sever, comprises detecting at least one unique web page attribute that allows to identify a known phishing web page as a phishing web page; analyzing, by the server, the known phishing web page to determine at least one additional unique attribute indicative of the known phishing web page targeting a phishing target web resource; generating, by the server, at least one phishing detection rule that is based on the at least one unique attribute and the at least one additional attribute; storing the at least one phishing detection rule; receiving a new web page to be checked for phishing; applying the at least one phishing detection rule for analyzing the new web page; in response to the analyzing rendering a positive outcome, identifying the new web page as a phishing web page.

16 Claims, 7 Drawing Sheets

(56) References Cited

U.S. PATENT DOCUMENTS

| | | | |
|---|---|---|---|
| 8,132,250 B2 | 3/2012 | Judge et al. | |
| 8,151,341 B1 | 4/2012 | Gudov | |
| 8,255,532 B2 | 8/2012 | Smith-Mickelson et al. | |
| 8,260,914 B1 | 9/2012 | Ranjan | |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1* | 3/2014 | Dotan | H04L 67/22 726/12 |
| 8,776,229 B1 | 7/2014 | Aziz | |
| 8,850,571 B2 | 9/2014 | Staniford et al. | |
| 8,856,937 B1* | 10/2014 | Wuest | H04L 63/1483 713/188 |
| 8,972,412 B1 | 3/2015 | Christian et al. | |
| 8,984,640 B1 | 3/2015 | Emigh et al. | |
| 9,026,840 B1* | 5/2015 | Kim | G06F 21/552 714/4.3 |
| 9,060,018 B1 | 6/2015 | Yu et al. | |
| 9,210,111 B2 | 12/2015 | Chasin et al. | |
| 9,215,239 B1 | 12/2015 | Wang et al. | |
| 9,253,208 B1* | 2/2016 | Koshelev | G06F 16/285 |
| 9,330,258 B1 | 5/2016 | Satish et al. | |
| 9,338,181 B1* | 5/2016 | Burns | H04L 63/1433 |
| 9,357,469 B2 | 5/2016 | Smith et al. | |
| 9,456,000 B1* | 9/2016 | Spiro | G06F 16/24578 |
| 9,654,593 B2 | 5/2017 | Garg et al. | |
| 9,723,344 B1 | 8/2017 | Granström et al. | |
| 9,736,178 B1 | 8/2017 | Ashley | |
| 9,917,852 B1 | 3/2018 | Xu et al. | |
| 9,934,376 B1 | 4/2018 | Ismael | |
| 2002/0161862 A1 | 10/2002 | Horvitz | |
| 2003/0009696 A1 | 1/2003 | Bunker et al. | |
| 2006/0074858 A1 | 4/2006 | Etzold et al. | |
| 2006/0107321 A1 | 5/2006 | Tzadikario et al. | |
| 2006/0224898 A1 | 10/2006 | Ahmed | |
| 2006/0253582 A1 | 11/2006 | Dixon et al. | |
| 2007/0019543 A1* | 1/2007 | Wei | H04L 63/1408 370/229 |
| 2007/0239999 A1* | 10/2007 | Honig | G06F 21/554 713/194 |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0011124 A1* | 1/2010 | Wei | H04L 63/14 709/243 |
| 2010/0037314 A1 | 2/2010 | Perdisci et al. | |
| 2010/0076857 A1 | 3/2010 | Deo et al. | |
| 2010/0115620 A1* | 5/2010 | Alme | H04L 63/1416 726/24 |
| 2010/0115621 A1 | 5/2010 | Staniford et al. | |
| 2010/0191737 A1 | 7/2010 | Friedman et al. | |
| 2010/0205665 A1* | 8/2010 | Komili | H04L 63/102 726/12 |
| 2010/0235918 A1 | 9/2010 | Mizrahi et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1* | 1/2014 | Schmidtler | H04L 63/1483 726/22 |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0310811 A1 | 10/2014 | Hentunen | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 | 6/2015 | Laidlaw et al. | |
| 2015/0170312 A1 | 6/2015 | Mehta et al. | |
| 2015/0200963 A1* | 7/2015 | Geng | G06F 21/51 726/22 |
| 2015/0220735 A1 | 8/2015 | Paithane et al. | |
| 2015/0295945 A1 | 10/2015 | Canzanese et al. | |
| 2015/0363791 A1 | 12/2015 | Raz et al. | |
| 2015/0381654 A1 | 12/2015 | Wang et al. | |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0055490 A1 | 2/2016 | Keren et al. | |
| 2016/0065595 A1 | 3/2016 | Kim et al. | |
| 2016/0112445 A1* | 4/2016 | Abramowitz | H04L 63/1425 726/23 |
| 2016/0127907 A1* | 5/2016 | Baxley | H04N 5/265 726/22 |
| 2016/0149943 A1 | 5/2016 | Kaloroumakis et al. | |
| 2016/0191243 A1 | 6/2016 | Manning | |
| 2016/0205122 A1* | 7/2016 | Bassett | G06F 21/577 726/23 |
| 2016/0205123 A1 | 7/2016 | Almurayh et al. | |
| 2016/0226894 A1* | 8/2016 | Lee | H04L 63/1425 |
| 2016/0253679 A1 | 9/2016 | Venkatraman et al. | |
| 2016/0261628 A1 | 9/2016 | Doron et al. | |
| 2016/0267179 A1 | 9/2016 | Mei et al. | |
| 2016/0285907 A1 | 9/2016 | Nguyen et al. | |
| 2016/0306974 A1 | 10/2016 | Turgeman et al. | |
| 2016/0359679 A1* | 12/2016 | Parandehgheibi | H04L 43/08 |
| 2017/0034211 A1* | 2/2017 | Buergi | G06F 21/566 |
| 2017/0111377 A1* | 4/2017 | Park | H04L 63/1458 |
| 2017/0134401 A1* | 5/2017 | Medvedovsky | H04L 63/1425 |
| 2017/0142144 A1 | 5/2017 | Weinberger et al. | |
| 2017/0149813 A1* | 5/2017 | Wright | H04L 63/1416 |
| 2017/0200457 A1 | 7/2017 | Chai et al. | |
| 2017/0230401 A1 | 8/2017 | Ahmed et al. | |
| 2017/0244735 A1* | 8/2017 | Visbal | G06F 16/9038 |
| 2017/0250972 A1* | 8/2017 | Ronda | H04L 9/08 |
| 2017/0272471 A1* | 9/2017 | Veeramachaneni | H04L 63/20 |
| 2017/0279818 A1* | 9/2017 | Milazzo et al. | |
| 2017/0286544 A1* | 10/2017 | Hunt | H04L 63/1416 |
| 2017/0289187 A1 | 10/2017 | Noel et al. | |
| 2017/0295157 A1 | 10/2017 | Chavez et al. | |
| 2017/0295187 A1 | 10/2017 | Havelka et al. | |
| 2017/0324738 A1 | 11/2017 | Hari et al. | |
| 2017/0346839 A1* | 11/2017 | Peppe | H04L 63/1433 |
| 2018/0012021 A1 | 1/2018 | Volkov | |
| 2018/0012144 A1* | 1/2018 | Ding | H04L 63/1416 |
| 2018/0034779 A1* | 2/2018 | Ahuja | G06F 16/90344 |
| 2018/0063190 A1* | 3/2018 | Wright | H04L 63/1425 |
| 2018/0096153 A1 | 4/2018 | Dewitte et al. | |
| 2018/0115573 A1* | 4/2018 | Kuo | H04L 63/101 |
| 2018/0268464 A1* | 9/2018 | Li | G06F 16/35 |
| 2018/0307832 A1* | 10/2018 | Ijiro | H04L 63/1416 |
| 2018/0309787 A1* | 10/2018 | Evron | H04L 63/1491 |
| 2019/0089737 A1* | 3/2019 | Shayevitz | G06F 21/56 |
| 2019/0207973 A1 | 7/2019 | Peng | |
| 2019/0373005 A1* | 12/2019 | Bassett | H04L 63/1441 |
| 2020/0134702 A1* | 4/2020 | Li | H04L 63/1483 |

FOREIGN PATENT DOCUMENTS

| | | |
|---|---|---|
| CN | 105429956 A | 3/2016 |
| CN | 105897714 A | 8/2016 |

(56) References Cited

FOREIGN PATENT DOCUMENTS

| | | |
|---|---|---|
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

European Search Report with regard to EP 17 19 1900 completed on Nov. 28, 2017.
European Search Report with regard to EP 17 19 1900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion with regard to the counterpart SG Patent Application No. 10201900335P.
Office Action with regard to the counterpart U.S. Appl. No. 16/261,854 dated Oct. 21, 2019.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Search Report with regard to the counterpart RU Patent Application No. 2016137336 completed Jun. 6, 2017.
English Abstract of RU2522019 retrieved on Espacenet on Jan. 25, 2019.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
European Search Report with regard to EP17180099 completed on Nov. 28, 2017.
Office Action with regard to the counterpart U.S. Appl. No. 15/707,641 dated Apr. 25, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year: 2005)—in the Notice of Allowance with regard to the counterpart U.S. Appl. No. 15/707,641.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Office Action with regard to the counterpart U.S. Appl. No. 16/270,341 dated May 27, 2020.

\* cited by examiner

| Field | Value |
|---|---|
| Brand | Bank name (e.g. "bank-name") |
| Phishing aim, phishing object | To receive account name (identifier) |
| Domain, domain name | bank-name.com, subdomain.bank-name.com, bank-name-partner.ru, http://bank-name.com |
| Special rule name | bank-name-rule-first |
| Special rule | detection_rule, e.g., «<title>((Transfer\sfrom\scard)).*?bank-name.*?b-card-payment-creditcard» |

[ Store ]  [ Check ]  [ Cancel ]

FIG. 3

SYSTEM AND METHOD FOR DETECTING PHISHING WEB PAGES

CROSS-REFERENCE

The present application claims convention priority to Russian Utility Patent Application No. 2016152427, filed on Dec. 29, 2016, entitled "СИСТЕМА И СПОСОБ ОБНАРУЖЕНИЯ ФИШИНГОВЫХ ВЕБ СТРАНИЦ". This application is incorporated by reference herein in its entirety.

FIELD OF TECHNOLOGY

The present technology relates to computers, particularly, to methods of and systems for detection of phishing web pages through creating phishing detection rules and further identifying phishing web pages.

BACKGROUND

Due to rapid development of computer technologies and networks, the problem of detecting phishing services and resources, such as web sites, web pages, applications, including mobile (Android, iOS, etc.) applications, is becoming increasingly important, since it is necessary to protect users from Internet-based fraud. Phishing is a special form of Internet based fraud, particularly, the attempt to obtain sensitive data of the users, such as their logins, passwords, credit card details (PINs, expiry dates, CVV2/CVC2 codes, numbers, card holder names), phone numbers, code words, confirmation codes (e.g. for money transfers or payments), etc.

Phishing resources, particularly, web sites or pages, are fake resources, i.e. fake web sites or pages, that mimic the appearance of a known/original resource. For instance, phishing (fake) web pages may mimic the appearance of an original web page of a bank, an e-payment system, or a login page, etc., especially one that requires the user to input confidential or sensitive data, or some other information that is valuable for the user (their clients, friends, relatives, etc.) and/or offenders. These phishing web pages (resources) are created by the offenders (fraudsters) to obtain sensitive data of web site users/visitors.

The data collected through phishing (phishing attacks) may be then used by the offenders, e.g. in order to steal money from a credit card (specifically, through illegal withdrawal), or to extort money for restoring stolen logins and passwords (fraudsters change either part, so that the user is unable to access some resource), or to extort money for keeping some valuable information secret, etc.

Links to phishing resources may be sent in text messages, a practice that is also known as "SMiShing". Also, links to phishing resources may be contained in mailing lists, on various web sites, including social network pages, or in computer programs, such as office applications, including mobile (Android, iOS, etc.) applications.

Currently, there are conventional technologies and methods for detecting phishing resources, e.g. web pages, through analysis of URL addresses by URL masks (URL—Uniform Resource Locator/Universal Resource Locator), of domain names by keywords, or through checking whether those pages upload contents from original web sites, or checking whether there are images associated with a certain brand (e g names/logos of banks, payment systems, resources, web sites, services, etc.), including the resource reputation. Such methods and technologies for countering phishing, Internet-based fraud and illegal access to sensitive information of users (visitors of web pages or users of applications, including mobile applications), and, particularly, methods and technologies for detecting phishing web pages may further comprise determining of domain name registration date (as well as its expiration date), or calculating hash values of web pages and comparing them to hash values that have been calculated earlier. Hash value (hash code, or simply hash) is a result of processing data with a hash function. A hash function is a function for translating an input array into a bit string of a fixed length using a given algorithm.

SUMMARY OF TECHNOLOGY

The objective of the present technology is to detect phishing web pages through creating phishing detection rules based on at least one unique attribute that allows identifying a web page as a phishing web page.

In accordance with a first broad aspect of the present technology, there is provided a method for detecting a phishing web page, the method executable by a server. The method comprises:

receiving, by a server, an indication of a known phishing web page;

detecting, by the server, at least one unique attribute that allows to identify the known phishing web page as a phishing web page;

generating, by the server, at least one phishing detection rule that is based on the at least one unique attribute, the at least one phishing rule for detecting a new potential phishing page as the phishing web page based on attributes thereof;

determining, by the server, additional data associated with the known phishing web page, the additional data including a phishing target identification;

associating, by the server, the additional data with the at least one phishing detection rule;

storing, by the server, the at least one phishing detection rule and the associated additional data, in a data storage;

receiving, by the server, at least one new web page to be checked for phishing;

extracting, by the server, the at least one phishing detection rule from the data storage;

executing, by the server, a code of the at least one new web page and, applying, by the server, the at least one phishing detection rule to analyze the at least one new web page; and based on an outcome of the at least one phishing rule, identifying the at least one new web page as a phishing web page, in response to the outcome being indicative of phishing activity in the code.

In some implementations of the method, the receiving, by the server, at least one new web page to be checked for phishing comprises receiving the at least one new web page, receiving the code of the at least one new page and a code of files linked from the at least one web page.

In some implementations of the method, the code of the new web page comprises one of an HTML code, a PHP code, a Java script, a CSS code, and a Java applet code.

In some implementations of the method, the code of files linked from the at least one web page comprises one of HTML code, PHP code, Java script, CSS code, and Java applet code.

In some implementations of the method, method further comprises analyzing unique attributes in the code of the at least one new web page and the code of files linked from the at least one web page.

In some implementations of the method, the unique attributes comprise at least one of: byte sequences, snippets of the code of the at least one new web page, and snippets of the code of files linked from the at least one new web page.

In some implementations of the method, the method further comprises detecting unique attributes, the detecting comprising at least one of: analyzing a frequency of byte sequences and analyzing code snippets.

In some implementations of the method, the at least one phishing detection rule comprises at least one regular expression.

In some implementations of the method, the method further comprises storing identified phishing web pages in a phishing web page database.

In some implementations of the method, additional attributes include at least one of: a phishing target brand, brand's official domain, phishing venue, phishing object, and phishing vector.

In some implementations of the method, in response to a determination of inability to generate the at least one phishing detection rule based on the at least one unique attribute being a single attribute, the method further comprises identifying a plurality of unique attributes and wherein the at least one phishing detection rule is generated based on the plurality of unique attributes.

In some implementations of the method, the data storage is at least one of: a Random Access Memory (RAM) memory, a hard drive disk (HDD), a network-based data storage system, and an online storage.

In some implementations of the method, the receiving, by the server, the at least one new web page to be checked for phishing comprises receiving the web page with its contents, the web page and its contents defined by an "fame" floating frame.

In some implementations of the method, the method further comprises receiving, from an operator, an identification of the unique attributes.

In some implementations of the method, the receiving the known phishing web page comprises receiving the known phishing web page from at least one of: a phishing web page database, a phishing web page link database, a phishing web site, web sites connected with phishing, a user's computer device, network sensors, application event logs, notification systems, e-mails, messaging applications, web services, and a feedback form.

A non-limiting embodiment of the present technology is a method for detecting phishing web pages that comprises the following steps: uploading a phishing web page onto a server; detecting at least one unique attribute that allows to identify the uploaded web page as a phishing web page; creating at least one phishing detection rule that would use the at least one unique attribute that allows to identify the uploaded web page as a phishing web page; linking additional data including phishing target identification to the at least one phishing detection rule; storing the at least one phishing detection rule, along with additional data linked to it that identify the phishing target, in a data storage; uploading at least one web page to be checked for phishing onto the server; calling at least one rule from the data storage; checking the code of the uploaded web page for phishing activity features using the at least one phishing detection rule that has been called; and identifying the uploaded web page as a phishing web page, if phishing activity features have been detected in its code.

In at least one non-limiting embodiment, a web page is uploaded along with its code and code of files linked to this web page.

In at least one non-limiting embodiment, the code of the uploaded web page includes HTML code and/or PHP code, and/or Java script, and/or CSS code, and/or Java applet code.

In at least one non-limiting embodiment, the code of files linked to the uploaded web page includes HTML code and/or PHP code, and/or Java script, and/or CSS code, and/or Java applet code.

In at least one non-limiting embodiment, unique attributes are detected in the code of the uploaded web page and the code of files linked to this web page.

In at least one non-limiting embodiment, unique attributes are byte sequences and/or snippets of the code of the uploaded web page and the code of files linked to this web page.

In at least one non-limiting embodiment, unique attributes may be detected in the code of the uploaded web page by the frequency of byte sequences and/or code snippets corresponding to these attributes in at least two phishing sets and/or at least two web pages containing or related to phishing activities.

In at least one non-limiting embodiment, phishing detection rules are described with regular expressions.

In at least one non-limiting embodiment, phishing web pages that have been identified as such are stored in a phishing web page database.

In at least one non-limiting embodiment, additional attributes include a phishing target brand and/or brand's official domain, and/or phishing venue, and/or phishing object, and/or phishing vector.

At least one non-limiting embodiment further comprises detecting two or more unique attributes that would allow to identify the uploaded web page as a phishing web page, in case it is impossible to create a phishing detection rule based on a single unique attribute.

In at least one non-limiting embodiment, the data storage is Random Access Memory (RAM) and/or hard drive disk (HDD), and/or network-based data storage system, and/or online storage.

In at least one non-limiting embodiment, a web page is uploaded along with its contents that are defined by its "fame" floating frame.

In at least one non-limiting embodiment, the unique attributes may be determined manually by an operator responsible for creating phishing detection rules.

In at least one non-limiting embodiment, a phishing web page may be uploaded from the phishing web page database and/or a phishing web page link database, and/or a phishing web site, and/or web sites connected with phishing, and/or a user's computer device, and/or network sensors, and/or application event logs, and/or notification systems, e-mails, messaging applications or web services, and/or a feedback form.

BRIEF DESCRIPTION OF THE DRAWINGS

The objects, features and advantages of the technology will be further pointed out in the detailed description as well as the appended drawings. In the drawings:

FIG. 3 depicts an example of visual display of the stored special rule, in accordance with non-limiting embodiments of the present technology.

DETAILED DESCRIPTION OF THE NON-LIMITING EMBODIMENTS

Figure 1:
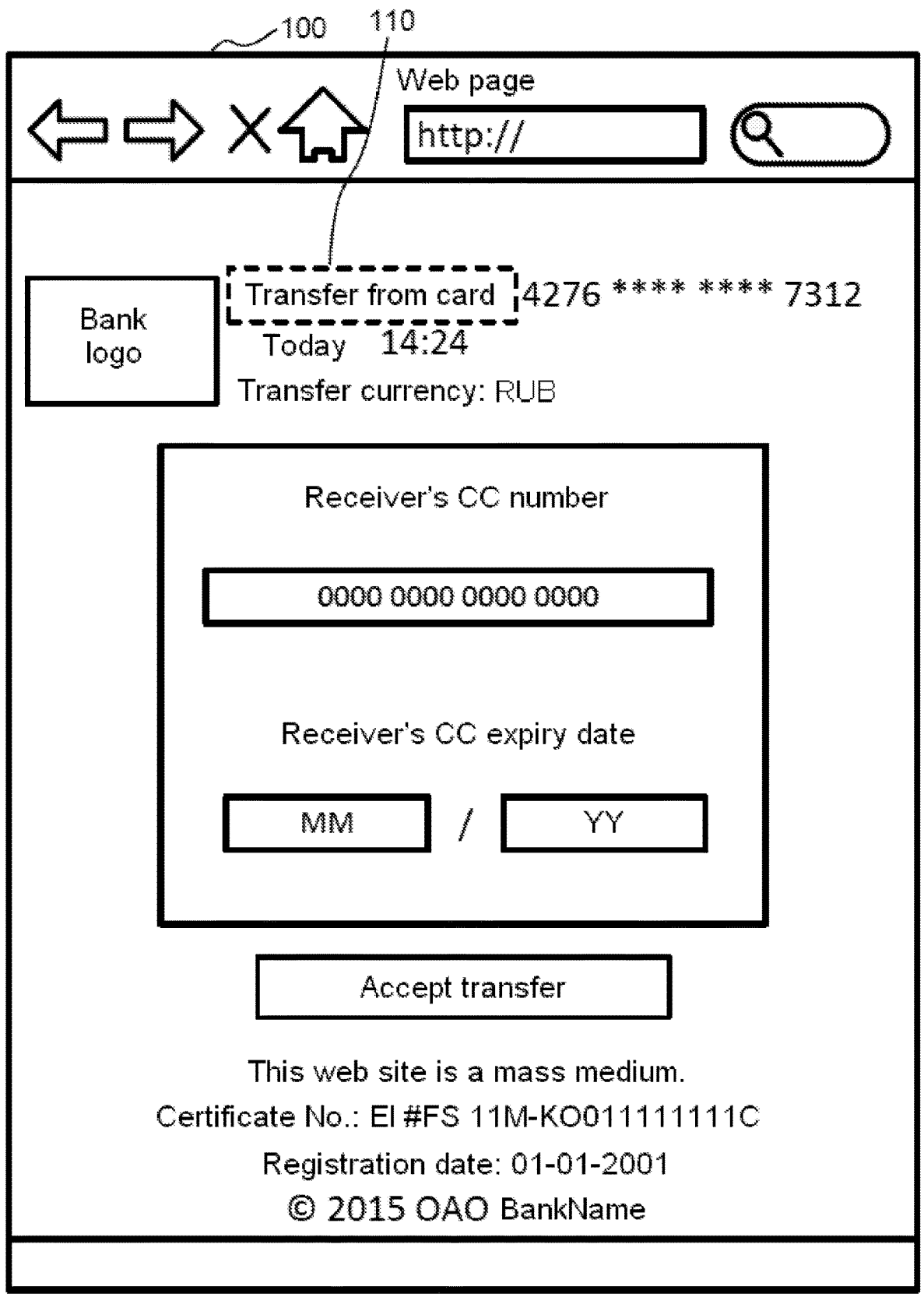
FIG. 1 depicts an example of a phishing web page, in accordance with non-limiting embodiments of the present technology.

Objects and features of the present technology, methods for achieving these objects and features will become apparent by reference to the non-limiting embodiments. However, the present technology is not limited to the embodiments disclosed herein, it may be embodied in various forms. Summary contained in the description, is nothing but specific details secured to aid those skilled in the art in a comprehensive understanding of the technology, and the present technology is only defined within the scope of the appended claims.

In order to evade detection by the conventional technologies and methods for detecting phishing resources, Internet-based fraudsters perform the following:

- they place their phishing web pages on compromised web sites with a good reputation and domain history, so that they are able to sidestep the phishing detection methods that are based on checking the web resource reputation and history;
- they create URI paths (URI—Uniform Resource Identifier/Universal Resource Identifier) to phishing web pages that do not mention the brand, or the name of the company/system, which allows them to sidestep the phishing detection methods that are based on the analysis of URL addresses by masks;
- they create phishing web pages with dynamic contents, so that these cannot be detected by calculating and comparing hash values; or
- they create autonomous phishing web pages that don't upload contents (elements) from original web sites, such as web sites of companies, payment systems, etc., but upload contents (elements) from local storages, including file (image) hosting services, etc., i.e. not from official resources, which allows them to avoid detection by the source of content uploading.

To facilitate the creation of phishing web pages, Internet-based fraudsters use so-called phishing kits, i.e. a ready-made set of web pages, scripts, configuration files, etc. that are customizable depending on what the offender intends to do with the information they obtain. Such phishing kits, like phishing web pages, have their own unique attributes (signatures), which may be used as a basis for special rules for identification of phishing kits, resources, web pages, etc.

The improvement of the technology as described herein comprises detection of phishing web pages through creation of at least one phishing detection rule (also referred to herein as "special rule" or "special phishing detection rule") based on at least one unique attribute that allows identifying a web page as a phishing web page.

A process of detection/identification of phishing web pages may have two steps: creating a special rule for identification of phishing web pages; and identifying a phishing web page using the so-created special rule for identification of phishing web pages.

Creation of a special rule for identifying phishing web pages includes: receiving a phishing web page to be analyzed for phishing (a model phishing web page or a link to such). Based on this known phishing web page (also referred to herein as "model phishing page"), special rules may be created, which then enable the system to identify the received page (also referred herein as "a new potential phishing page") as a phishing web page and other web pages as well. The known phishing web page may be uploaded, e.g. into the system, in order to create at least one special rule (at least one phishing detection rule) for the uploaded web page (the new potential phishing web page).

It should be noted that a web page (a known phishing web page and/or the new potential phishing web page) may be uploaded along with associated files. For instance, when an index.html web page is uploaded, it may be accompanied by CSS style tables (e.g. style.css) and other files, such as .html and/or .php, and/or Java scripts, and/or Java applets. When the code of the uploaded web page is uploaded, it may include the code of the associated files mentioned above. Also, the web page may be uploaded onto the workstation (computer system, e.g. a server, a PC, a terminal, etc.) of the operator responsible for creation of the special rules.

The model phishing web page may be uploaded into a computer system capable of displaying said page to the operator responsible for creation of special rules, so that the page is easily comprehensible, e.g. as HTML code. In fact, any web page that is likely to contain traces of phishing activities or that is connected to a phishing attack, phishing resources, etc., or a page that has been already identified as a phishing web page, may be used as a model phishing web page.

The model phishing web page (or, e.g., a link to a phishing resource, web page) may be obtained, e.g. from existing databases containing phishing web pages, and/or databases containing links to phishing web pages, or from phishing web sites; also, phishing web pages and links to them may be obtained from a user's device, a server, a PC, e.g. from bank clients or officers, administrators of a resource or service, using conventional technologies and methods, including those mentioned in the present disclosure. Also, links to phishing resources may be obtained from network sensors, application logs, system alerts, e-mails, or messengers, or may be sent through feedback forms, e.g. as a link to a phishing web page or other sources that may contain links to phishing resources. Links to phishing resources may also be defined in the data sent for phishing analysis.

Phishing web pages may mimic or try to pass as an original web page, as mentioned above. A phishing web page imitating money transfer between cards is discussed herein as an example, by no means limiting.

FIG. 1 depicts an example of a phishing web page 100, which may be a model phishing web page or a web page that may be identified as a phishing web page (a potential phishing page), in accordance with non-limiting embodiments of the present technology. The model phishing web page may look no different from the original web page, or difference may be very subtle (i.e. non-appreciable to the user of the original web page). It should be noted that phishing web pages may be partially or completely different from original web pages and other resources, both in their appearance and code.

In order to obtain a model phishing web page, its HTML code is uploaded into some software that is capable of displaying this code, specifically, so that it is comprehensible to the operator. Such software may include a web browser and its built-in developer's kit, which allow seeing the uploaded code, or console applications, a text editor (e.g. Notepad++), a specialized software capable of displaying and/or analyzing HTML code, an HTML editor, etc., as well as standard applications that are built into operating systems, such as Windows Notepad.

After the HTML code of the web page has been uploaded, it is analyzed for unique attributes characteristic of phishing web pages, which may then be used to identify such pages. Unique attributes may be presented as a byte set (sequence) in the code of the HTML page. The unique attributes may include byte sequences that are related to the brand, phishing target or venue. The HTML code of a model phishing web page may be analyzed by a human accessor, e.g. by a programmer, a software developer, a system administrator, an operator, etc. on a computer device that has received the model phishing web page with its HTML code. Alternatively or additionally, the HTML code of the model phishing web page may be analyzed automatically, e.g. with special software capable of detecting unique attributes of phishing web pages.

Such unique attributes contained in the HTML code of a phishing web page may include (but are not limited to): identifiers of various operations (e.g. with credit cards, e-payment systems, etc.), various reserved or frequently used words and phrases (e.g. company name, money transaction name, service/product name, including software or application titles), code or its parts that are used to identify the user or their actions. Identifiers of various operations, such as money transfer, payment, etc., may include "Receiver's CC#", "Sign the money order", "Accept the transfer", etc. Some of this additionally determined information can be considered to be "additional data". This additional data can be associated with the at least one phishing detection rule, at least in some non-limiting embodiments of the present technology.

Below is a sample of the HTML code of an example of a phishing web page (a model phishing web page):

```
«
<!DOCTYPE html>
<html><head><meta http-equiv="Content-Type" content="text/html; charset=UTF-8">
    <link rel="stylesheet" type="text/css" href="https://pay.mobile-operator-web-site.ru/css/light/jquery-ui.css">
    <title>Transfer from card 4276 **** **** 7312</title>
    <meta name="robots" content="noindex, nofollow">
    <meta name="viewport" content="width=device-width, initial-scale=1.0, user-scalable=0, minimum-scale=1.0, maximum-scale=1.0">
    <meta name="apple-mobile-web-app-capable" content="yes">
    <meta name="apple-mobile-web-app-status-bar-style" content="black">
    <meta name="format-detection" content="telephone=no">
    <link type="image/x-icon" rel="shortcut icon" href="http://www.bank-name.ru/portalserver/static/sb-bundle/images/favicon.ico">
    <link rel="stylesheet" href="https://pay.mobile-operator-web-site.ru/css/light/reset.css" type="text/css">
    <link rel="stylesheet" href="/img/card-payment.css" type="text/css">
    <link rel="stylesheet" href="/img/card-payment-creditcard.css" type="text/css">
    <link rel="stylesheet" href="https://pay.mobile-operator-web-site.ru/css/light/card-payment-success.css" type="text/css">
    <link rel="stylesheet" href="https://pay.mobile-operator-web-site.ru/css/light/card-payment-error.css" type="text/css">
    <link rel="stylesheet" href="https://pay.mobile-operator-web-site.ru/css/light/card-payment-popups.css" type="text/css">
    </head>
    <body class="body_wrapper">
    <div class="p_wrapper">
    <div class="b-header">
    <a href="http://bank-name.ru/" class="b-header_logo" title="Наглавную"></a>
    </div>
    <div class="p-card-payment">
    <div class="p_layout">
    <div id="content" class="b-card-payment-creditcard js-tile">
    <h1 class="b-card-payment_title b-card-payment_view_mobilemargins">
    Transfer from card 4276 **** **** 7312  </h1>
    <time class="b-card-payment_time b-card-payment_view_mobilemargins">Сегодня, 14:25</time>
    <p class="b-card-payment_help b-card-payment_view_mobilemargins" style="font-weight:bold">
    Transfer currency: <b>RUB</b>
    </p>
    <div class="b-card-payment-creditcard_form-wrap">
    <form class="paybycard-form" id="form-topayment" action="" method="post">
    <input type="hidden" name="hash" value="13394967307952515991442710006" />
    <input type="hidden" name="r" value="" />
    <input type="hidden" name="pay" value="" />
    <div class="b-card-payment-creditcard_left" style="height:245px">
    <h4 class="b-card-payment-creditcard_title">Receiver's card number</h4>
    <input class="b-card-payment-creditcard_card-number js-required-field js-required-field-card" id="pan_" autocomplete="off" maxlength="31" tabindex="1" type="tel"
```

-continued

```
placeholder="0000 0000 0000 0000" name="number">
    <h4 class="b-card-payment-creditcard__title">Receiver's card expiry date</h4>
    <div class="b-card-payment-creditcard__date-wrap">
    <input class="b-card-payment-creditcard__month is-required-field js-required-field-
month" id="exp_month" name="date" tabindex="2" type="tel" placeholder="MM"
maxlength="2" autocomplete="off"> /
    <input class="b-card-payment-creditcard__year js-required-field js-required-field-
year" id="exp_year_" tabindex="3" name="date_2" type="tel" placeholder="ГГ"
maxlength="2" autocomplete="off">
    </div>
    </div>
    <div class="b-card-payment-creditcard__buttons-wrap">
    <button id="cardsubmitbtn" title="" class="b-card-payment-creditcard__pay-button
js-next-button" name="send">Accept transfer</button>
    </div>
    </form>
    </div>
    <ul class="b-card-payment-creditcard__icons">
    <li class="b-card-payment-creditcard__icon"><img src="/img/m.png" alt=""
class="b-card-payment-creditcard__icon__width"></li>
    <li class="b-card-payment-creditcard__icon"><img src="https://pay.mobile-operator-
web-site.ru/i/l/verified-visa.png" alt="" class="b-card-payment-
creditcard__icon__width"></li>
    <li class="b-card-payment-creditcard__icon"><img src="https://pay.mobile-operator-
web-site.ru/i/l/verified-mastercard.png" alt="" class="b-card-payment-
creditcard__icon__width"></li>
    <li class="b-card-payment-creditcard__icon"><img src="https://pay.mobile-operator-
web-site.ru/i/l/verified-pci.png" alt="" class="b-card-payment-creditcard__icon__width"></li>
    </ul>
    </div>
    </div>
    </div>
    </div>
    <div class="b-footer-copy" style="text-
align:center;color:#999;padding:20px;padding-top:0px"><span class="b-footer-
copy__line1">This website is a mass medium. </span><span class="b-footer-
copy__line2">Certificate No. Эл № FS 11M - KO011111111C. </span><span class="b-
footer-copy__line3">Registration date: 01.01.2001.<span class="b-footer-copy__line4"> ©
2015 BankName LLC</span></span></div>
    </body></html>
»
```

Strings, substrings and other constituent parts of the code above may differ, e.g. depending on the resource it is distributed by, or the type of phishing attacks, or additional data uploading scripts that may be connected to phishing resources, etc. Although the code above is HTML code, it should be noted that scripts, such as PHP scripts, Java code, js.java scripts, or web formatting code, loadable code, or data streams that may be used with and/or without transformations, etc. may be used instead.

For the phishing web page 100 (a potential phishing web page) shown in FIG. 1, the following unique attributes may be detected during the analysis of the HTML code above, such as:

the heading (<title>) "Transfer from card" or some set of words/symbols/etc., such as "Transfer from card" that corresponds to the data 110 displayed in the received web page in FIG. 1;

the block with the "b-card-payment-creditcard" tag, particularly, a part of the code, e.g. HTML code, that may include a set of words/symbols/links/tags/etc.;

the word "bank-name", e.g. between the given heading and the block with the "b-card-payment-creditcard" tag, wherein this word may refer, e.g. to a brand (name of a bank, service, web site, service type, etc.).

Official names/brand names (i.e. brand names belonging to specific owners: companies, web resources, applications, etc.) that may be used to check whether they appear on other web pages, particularly, phishing web pages (specifically, in their HTML code), may be stored either in the memory of the operator responsible for web page identification, or in dictionaries (both digital and paper), tables, brand databases, or other forms and formats that allow them to be used for aforementioned purposes.

The unique phishing attributes may be detected either by the operator responsible for HTML code analysis or using software capable of detecting such attributes either automatically or with some operator's input. Their uniqueness may be determined both by the operator and the software (either with or without input by the operator or user, e.g. owner of the resource, etc. affected by the phishing attack or suspected in being associated with phishing activities) based on frequency of some words, word combinations, code parts, etc., which may be connected, e.g. to a brand, name of an official or phishing resource, etc. For instance, "bank-name" (name of the bank) may appear several times on a single HTML page or other web pages, in phishing kits, etc.

Also, such unique attributes or parts thereof may be associated with phishing kits, e.g. appear in several phishing kits, on several phishing web pages or other web pages that are potentially associated with phishing attacks. The uniqueness of such unique attributes may be determined either empirically or with special rules for detecting such attributes implemented as algorithms that take into account, e.g. attributes contained in phishing kits, phishing web page databases, and that are capable of finding such attributes in the HTML code of a page without input from the operator responsible for finding them. Such rules for detecting unique attributes may be stored together with phishing web pages (e.g. model ones) and/or with phishing analysis results, and/or other unique attributes that have already been stored, or in a separate database.

The uniqueness of selected attributes is determined by the set of attributes defined by the operator/user of the device or through computer systems and their software, since each attribute may be not necessarily unique either on itself or together with other attributes and rules. Also it should be noted that if a phishing resource mimics the contents from the official resource, then certain elements, such as scripts, text, images, tags, etc. that are not present on the official resource may be used as unique attributes.

Such unique attributes that has been found (three, in this example) may be described with a special rule (regular expression), such as, for example: <title>((Transfer\sfrom\scard)).*?bank-name.*?b-card-payment-creditcard.

It should be noted that special rules may contain tags, special symbols, code for page layout, as well as links and parts of scripts and resources that are accessed by the code of the resource being analyzed. When a special rule is being created, additional special symbols and/or codes or combinations thereof may be used, as well as special combinations, e.g. those marking spaces between words or code parts, line breaks, tabulation, etc. Here, "/s" is an example of such special symbol. It marks a space between words, i.e. «Transfer\sfrom\scard» should read as "Transfer from card". Also, "*?", that may be found in the example of the special rule above, is used for lazy matching. Lazy matching is aimed at searching for shortest strings, i.e. a minimum string that corresponds to the template. A lazy quantifier is the opposite of a greedy one, meaning that is "works a minimum number of times". Greedy matching is aimed at locating the longest string that corresponds to the template. A regular expression is a means for processing strings or byte/symbol sequences that define the text template. Lazy quantifiers in regular expressions may be represented by, e.g. «*?», «+?», «{n,}?», etc.

It should be noted that the given example of a special rule is just an illustration, as such special rules may be generated and written in any way and form. In particular, the special rules may be generated so that they can be "understood", processed and identified by the software utilized for searching through data (e.g. HTML code) using said rules/regular expressions. Special rules/search rules/regular expressions may be a formalized language to search and process strings and their components in a data set. Such language may use metasymbols and substitute characters.

Special rules are based on template/mask strings (here, «:<title>((Transfer\sfrom\scard)).*?bank-name.*?b-card-payment-creditcard"») that contain symbols and metasymbols, and control the data search.

Thus, in at least one embodiment of the present technology, a special rule is created by combining unique attributes together.

After such special rule has been created, it may be used to search for similar unique attributes in phishing kits, HTML code of web pages, such as those that have been submitted to be analyzed for phishing.

Figure 2:
FIG. 2 depicts an example of a search for unique attributes in the HTML code of a phishing web page, using a special rule, in accordance with non-limiting embodiments of the present technology.

FIG. 2 illustrates applying of a special rule to initial source code of the same web page that was used to extract the unique attributes for that special rule.

FIG. 2 depicts an example of a process of a search for unique attributes in the HTML code of a phishing web page, using the special rule, in accordance with non-limiting embodiments of the present technology. FIG. 2 also depicts examples of unique attributes (specifically, 240, 250 and 260) that have been determined by the special rule 220 in the search line 225 containing the special rule.

Block 230 contains detected information that precisely or vaguely identifies phishing activities if the special rule «<title>((Transfer\sfrom\scard)).*?bank-name.*?b-card-payment-creditcard» 220 mentioned above is applied in the original HTML code of the model phishing web page as shown in FIG. 1. In each separate case, depending on the special rule, the size of the block of data, their parts, etc. may vary based on phishing attributes shown in FIG. 2, i.e. the block depends on the special rule. Thus, when different rules are used, different blocks of data will be found.

When a special rule is being created/generated and/or tested, and/or used to analyze known (or unknown) phishing resources, it may give false positive results, i.e. a web page that is not associated with phishing may be identified as a phishing web page. For instance, if the «<title>((Transfer\sfrom\scard)).*?bank-name.*?» special rule is used, i.e. that lacks a unique attribute, instead of the «<title>((Transfer\sfrom\scard)).*?bank-name.*?b-card-payment-creditcard» rule, the analysis may result in finding at least one web page that is not associated with phishing attacks.

Background, icons, sources of loadable elements of web pages, as well as other parameters, such as styles, fonts, etc. may vary from resource to resource, but if the above mentioned special attributes are present, it is possible to identify similar phishing resources, particularly, web pages.

Therefore, by using the special rule that has been created based on certain unique attributes, it is possible to identify a resource as a phishing (fake, potentially dangerous for the user and/or company/web site, etc.) one. In case phishing resources are not identified unequivocally, the special rule that is used may be modified, e.g. with additional unique attributes. Thus, the special rule allows to find out whether the web page analyzed for phishing is a phishing web page, i.e. whether it is somehow associated with phishing attacks or any other fraudulent activity within the scope of the present technology or invented in the future.

The special rules (also referred to herein as "phishing detection rules" or "special phishing detection rules") described above may be used to identify phishing web pages as rules for phishing web page identification.

Such special rules may be created for a set of phishing kits (or a single kit, which, in turn, may be associated somehow to other similar phishing kits and/or web pages, web resources, etc.), a phishing resource (e.g. a web resource, a mobile resource, etc.), a phishing web page, as well as for a specific kit, web page, or resource/web resource. Such "fake" resources (phishing kits, web pages, web resources, applications, etc.) may correspond to basic aims of phishing attacks (phishing activities in general, including indirect phishing, i.e. using third-party resources or means, as well as links to phishing resources that activate them, including web links, various scripts, such as those written in C#, Java, JavaScript and other programming languages), company names, domain names, web site titles, brands, key attributes of a web site or an application, characteristic features, images, slogans, phases associated with user registration or other operations, such as financial transactions, data exchange, obtaining credit card information, etc.

Using the approach described above and non-limiting embodiments of the present technology, the phishing resources, web pages, etc. that have been identified using a given special rule, may be further used not only to detect phishing activities, but also to identify phishing aims, such as famous brands, web resource names, domain names, company names that have been compromised by the fraudsters or used in phishing attacks. It should be noted that the approach described above allows to identify the purpose of a phishing web page/resource, be it, e.g. obtaining information on identification or registration data of the user, visitor (such as login and password), collection of personal data, getting information on credit cards and bank accounts, etc.

After the resource or brand that have been compromised (used for phishing), as well as associated electronic devices and/or digital means, have been identified, official (legitimate) domains (domain names) may be attached to special rule(s) and may be also stored in a database, in order to minimize the possibility of false positive results when analyzing official resources and web sites.

It should be noted that domain names, brands, official domains, etc. may be attached to the end of the regular expression like <title>((Transfer\sfrom\scard)).*?bank-name.*?b-card-payment-creditcard bank-name, bank-name-domain-name.com. Such regular expression may be optionally stored in a file, database, RAM, etc. Also, regular expression and associated information, such as brand name, domain name, etc. may be stored in different cells of a table that are connected to each other. Special rules may be stored in at least one database, in one or more tables of a database. For instance, when rules and associated resources, domain names, brands, etc. are stored in the same table, a rule may occupy one cell of that table, and at least one other cell corresponding to that one may store at least one value corresponding to the brand, domain name, phishing aim, etc. When special rules are stored in one table, and associated brands, domain names, etc. are stored in at least one other table (or the same one) of the same database or at least one other database, then cells in those tables may be connected, e.g. via links or any other database mechanism. For instance, one cell of one database table that stores the rule, may be linked to at least one cell of another database table that stores at least one brand, domain name, phishing aim, etc. Also, one cell in the table of the special link database that stores the rule may be linked to at least one cell in the table of the brand, domain name, etc. database that stores at least one brand, domain name, etc. A possible alternative is that a cell in the table of a brand, domain name, etc. database/databases is linked to at least one cell in the table of the special rule database that stores the rule. This way, special rules are linked to brands, domain names, etc. and vice versa. It should be noted that since phishing web pages mimic (to some extent) the contents of official/legitimate resources, it may so happen that the analysis using a special rule results in official web site being identified as a phishing web page, or as a resource associated with phishing attacks. Therefore, in order to prevent such situations, special rules may be linked to legitimate domains, which will not be affected at all or will be partially affected by the analysis using special rules or a set of special rules.

After a special rule for detecting phishing web pages has been created, it may be stored, e.g. in a database or RAM of the device that carries out identification of phishing resources. The rule may be stored in the same database that already stores model phishing web pages and/or in a different one. Also, the rule may be stored in RAM or on the hard drive of the device that carries out checks for possible phishing attacks, e.g. a server with software, or a service that creates special rules, or user device/server, net equipment that send queries for phishing detection.

The rules may be stored in any known format, e.g. as a text file, a set of text files, hashed data, tables, SQL tables, data sets, including hash codes for rules, which may be further addressed by a query that is sent, e.g. to the database, including relational databases, that store the rules, particularly, using key values/key words/keys to locate a specific special rule. Such special rules may be stored in a separate database or together with other data, such as model phishing web pages, resources, etc., particularly, using methods for storing data, special rules, and/or phishing resources, etc. that are described in, but not limited to, the present disclosure.

Also note that special rules may be stored at least as one regular expression, along with associated attributes, such as brand, its official domains, phishing aim and/or venue, etc. For instance, the phishing aim may be to get access to sensitive data of users, e.g. their passwords or registration data. Phishing venues include such attacks as "man-in-the-middle", URL/web address substitution, "cross-site scripting", advance sessions, client data substitution, client vulnerabilities, etc.

FIG. 3 depicts an example of visual display of the stored special rule. As described above, the special rule may include the brand name, resource name, etc., which are connected to the created/generated special rule or a resource that has been compromised. Also, the special rule may include the phishing aim, object of phishing, phishing vector, that are defined, e.g. by direction and type of distribution of malicious code and intentions, as well as by target objects and technologies, means used, etc. The domain (domain name) may be represented by at least one legitimate domain, or a list of legitimate domains associated with the brand under attack.

The name of the special rule (see FIG. 3) is used for the purposes of search, e.g. search in databases, including those containing stored rules, model phishing pages, etc., as described in the present disclosure, but not limited to it.

A special rule may be verified as described herein, e.g. by clicking (e.g. with a mouse) the "verify" button.

The operator may cancel the creation of a rule, or may confirm storing a rule by clicking the "save" button.

Figure 4:
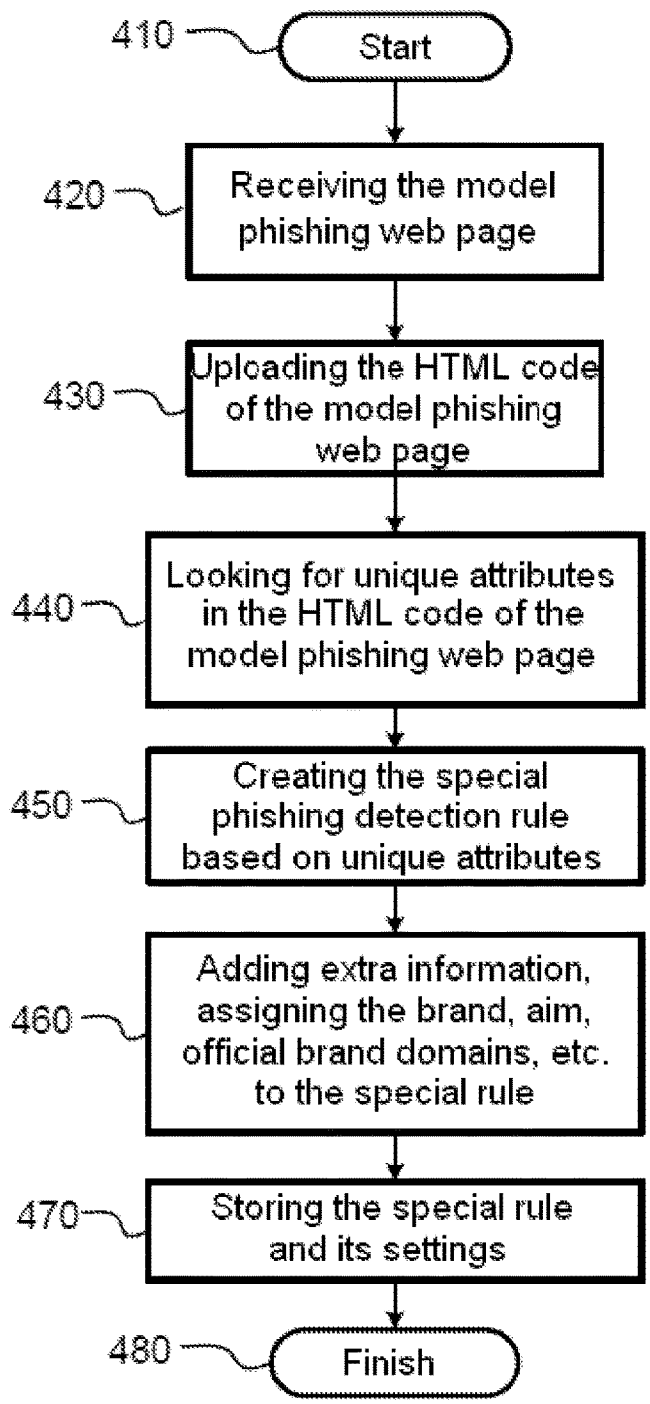
FIG. 4 is a block diagram of a flowchart of a method for generating special phishing detection rules, in accordance with non-limiting embodiments of the present technology.

FIG. 4 depicts a block diagram of a flowchart of a method for generating special phishing detection rules for detecting phishing web pages, in accordance with non-limiting embodiments of the present technology.

The process starts with step 410. At step 420, a model phishing web page (also referred to herein as a "known phishing web page") is received. The model phishing web page may be any web page received by any of the methods described above. The web page received may become the model phishing web page after it has been analyzed, and a special rule for further identification of phishing web pages has been created on this basis. Also, such phishing web page may be stored in the (model) phishing web page database. The rule created for a web page that has been analyzed may also be stored, regardless of the fact whether the web page has been identified as a phishing web page or it is yet to be identified as such.

After a model phishing web page has been received, the process proceeds to step 430, where the HTML code of the model phishing web page is downloaded, as described above. After the HTML code of the model phishing web page has been downloaded in step 440, it is searched for unique attributes that may be used to detect phishing activities, including phishing resources or web pages, etc.

Then, the process proceeds to step 450, where the unique attributes that have been found are used to create a special rule for phishing detection. For instance, the operator may generate/write regular expressions according to rules for generating regular expressions using unique attributes as parameters. Such unique attributes may be detected, e.g. by the operator (who is responsible for finding them, generating special rules and detecting phishing activities) through manual analysis of the HTML code (or any other set of data, which are either structured, partially structured, or not structured, including compiled, encrypted, cached, hashed, obfuscated, etc. data, which may be first translated into a "readable" format, e.g. to be analyzed using the software mentioned above to detect unique or similar attributes), in order to detect sequences of bytes, symbols, parts of code (e.g. HTML) that are characteristic of at least one phishing attack. The data mentioned above may be obtained as a data stream (including web page data retrieved on-line) from data sources that are mentioned in the present disclosure, both external ones (e.g. software or hardware means as mentioned above, but not limited to them) and internal ones, such as data sources integrated into the device (and/or connected to it via a data transfer interface) which performs data analysis to detect unique attributes and/or to create special rules.

After step 450, the process proceeds to step 460, where more data are added, such as the brand name, phishing aim, official domains, etc. as described in, but not limited to, the present disclosure. Additional data allow not only to identify a phishing attack, but also to find and present extra information (e.g. to the operator, user, brand, etc.) that the brand, web site, resource, etc. in question is used by fraudsters to obtain sensitive data as described in the present disclosure.

After step 460, the process proceeds to step 470, where the special rule is stored. Specifically, individual special rules are created for each web page.

After step 470, the process for creating special rules for phishing resources, particularly, phishing web pages, finishes with step 480.

Figure 5:
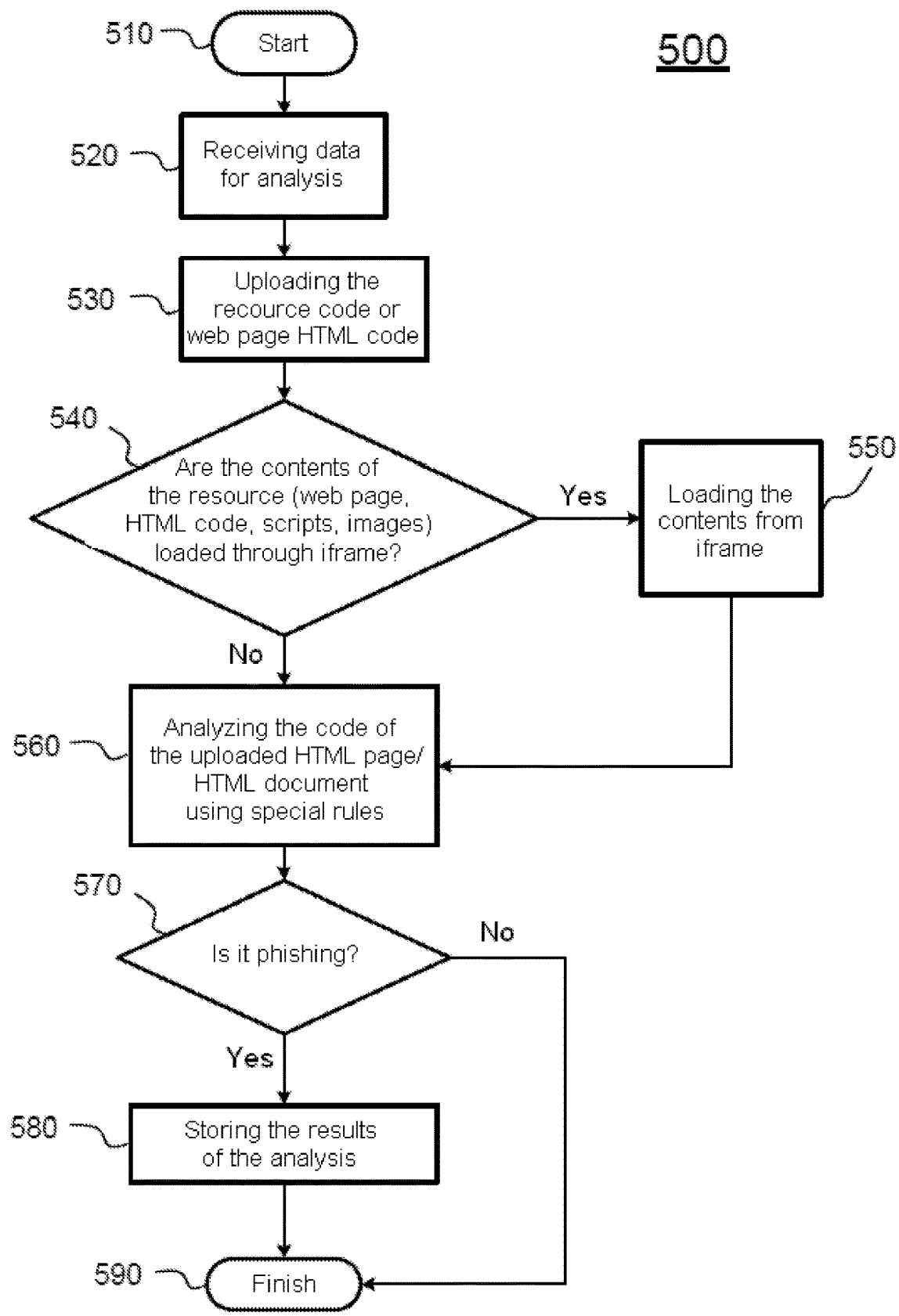
FIG. 5 is a block diagram of a flowchart of a method for detecting phishing resources, in accordance with non-limiting embodiments of the present technology.

FIG. 5 depicts a block diagram of a flowchart of a method for detecting phishing resources, in accordance with non-limiting embodiments of the present technology. As mentioned above, after the special rule is created, it may further be used to identify phishing resources, particularly, web resources, web pages, etc. FIG. 5 illustrates an example of identification of a phishing resource.

The process of identification of a phishing resource starts with step 510. In step 520, the data potentially containing traces of fraud activities, such as phishing, etc. are received for analysis. It should be noted that the data to be analyzed for phishing may be received from any sources, such as those listed above, and also from a proxy server log, a malicious link database, etc.

After step 520, the process proceeds to step 530. In step 530, the contents of the resource in question (a web page, etc.) are downloaded to be analyzed, particularly, for links to web sites, fraud-related resources, etc. Specifically, HTML code in the data received is analyzed.

Then, the process proceeds to step 540, where it is checked whether the contents (e.g. of a web page) are uploaded with iframe (floating frame), since some (attacking) phishing resources, services, programs, scripts, etc. upload phishing contents with iframe utilizing algorithms and mechanisms for insertion of said contents, such as web pages, loadable scripts, executable codes, etc., into the original contents of a web page. Also, when downloading the web page, various means and methods may be used to redirect to another resource, particularly, another web page, including so-called "short links" (shortened URLs, alternative URLs produced by URL shortening services), etc. Thus, the resource contents, particularly, the web page contents, are not necessarily collected from different sources (e.g. different web sites, or different folders/sub-folders of the same web site). In fact, the client or the operator may receive, e.g. from the data source described herein, a short link, such as a web link, or a database-to-database link, or database table-to-table link, etc., which, in turn, is capable of redirecting the user to another, secondary or just different resource using and/or loading additional resources, scripts, etc., and also capable of activating various program codes that are concealed by computer systems and services, particularly, the codes that are somehow connected to fraudsters. In this case, when the link (e.g. a URL) is visited, the user is redirected by browser means, scripts, phishing programs or other programs that are installed on the device, etc. to a phishing resource and/or an associated resource.

In HTML documents, the <iframe> tag is used to create a "floating" frame that is located inside such document and allows to load some contents (e.g. HTML code) into an area of fixed dimensions (including a fullscreen window in a browser) inside other documents, particularly, HTML documents. It should be noted that extra phishing contents (or associated contents, such as scripts, links, etc.) may be loaded not only with iframe, but also using similar or different methods for downloading contents, resources, etc.

In case it has been established in step 540 that the resource in question loads phishing contents with iframe, the process proceeds to step 550, where the system downloads the contents listed in the iframe tag or a similar tool capable of loading additional data (web page contents, scripts, executable code, etc.). In this case, both the resource data downloaded in step 530 and the code (e.g. HTML code) listed in iframe may be analyzed. The operator may detect contents that are additionally loaded, e.g. with the iframe tag, either by finding said tag in the HTML code manually, or by using the software capable of finding said tag in the HTML code.

If the HTML code of the page contains data loaded with the iframe tag, an additional handler may be used that looks for said tag in the code of the page. Such handler would be able to detect the iframe tag (along with other elements of the web page or those connected to the web page/resource) and determine whether those data have to be loaded separately or together with the HTML code of the page, where the tag has been detected. It should be noted that the uploaded page, particularly, its HTML code, may contain just the data loaded with the iframe tag (or similar methods of loading additional data/contents), i.e. the web page may contain no other contents than those loaded with the iframe tag, therefore it may be necessary to load those data separately. In this case, the system will analyze the HTML code that is loaded with the iframe tag, while both the page with this tag and the page loaded with it may be identified as phishing web pages.

As mentioned above, the web page, particularly, its HTML code, as well as its parts and other resources associated with it, e.g. through scripts, executable code or other technologies, may be loaded with a web browser, console utilities or specially designed tools.

After step 550, the process proceeds to step 560. If it was not established in step 540, that the phishing contents are loaded with the iframe tag (and/or code capable of downloading and/or replacing the existing web page contents, and also capable of modifying links to images, web resources, web pages, etc., including replacing real links with phishing links), then the process also proceeds to step 560.

At step 560, the downloaded code (HTML code, script code, executable code, etc.) is analyzed using the special rules that have been created and described above, wherein the HTML code is downloaded using one of the methods described above. In order to analyze the HTML code of the downloaded web page with the created set of rules, the code (HTML code, loadable contents, etc.) of the resource in question, particularly, a web page are checked for unique attributes. The check may utilize the code that is executed by computing devices and is written in compilable, as well as intermediate, programming languages, such as C++, C#, Python, etc., or the check may utilize various applications or auxiliary software designed for special tasks, that support processing of special regular expressions.

If it is established that some parts of the analyzed code may be described by at least one of the special rules, then the resource containing said code (or if the resource is somehow related to said code, e.g. see above) may be identified as a phishing resource.

After analysis is performed in step 560, the process proceeds to step 570, where it is established whether the resource in question is a phishing resource. If the analyzed resource (a web page, a part of the data received, etc.) has not been identified as a phishing resource in step 570, the process proceeds to step 590—the final step.

If the analyzed resource/data have been identified as related to phishing in step 570, the process proceeds to step 580, in which the results of the analysis of the data and resources (particularly, web resources) are stored, along with the fact that the analyzed resource is a phishing resource.

The results of the analysis of the data that has been identified as related to phishing, the results that are stored include, but are not limited to, the date of detection, the address of the phishing resource, the phishing web page, the brand name, the phishing goal, the HTML code of the phishing web page, a screenshot.

After step 580, the process proceeds to step 590—the final step.

Figure 6:
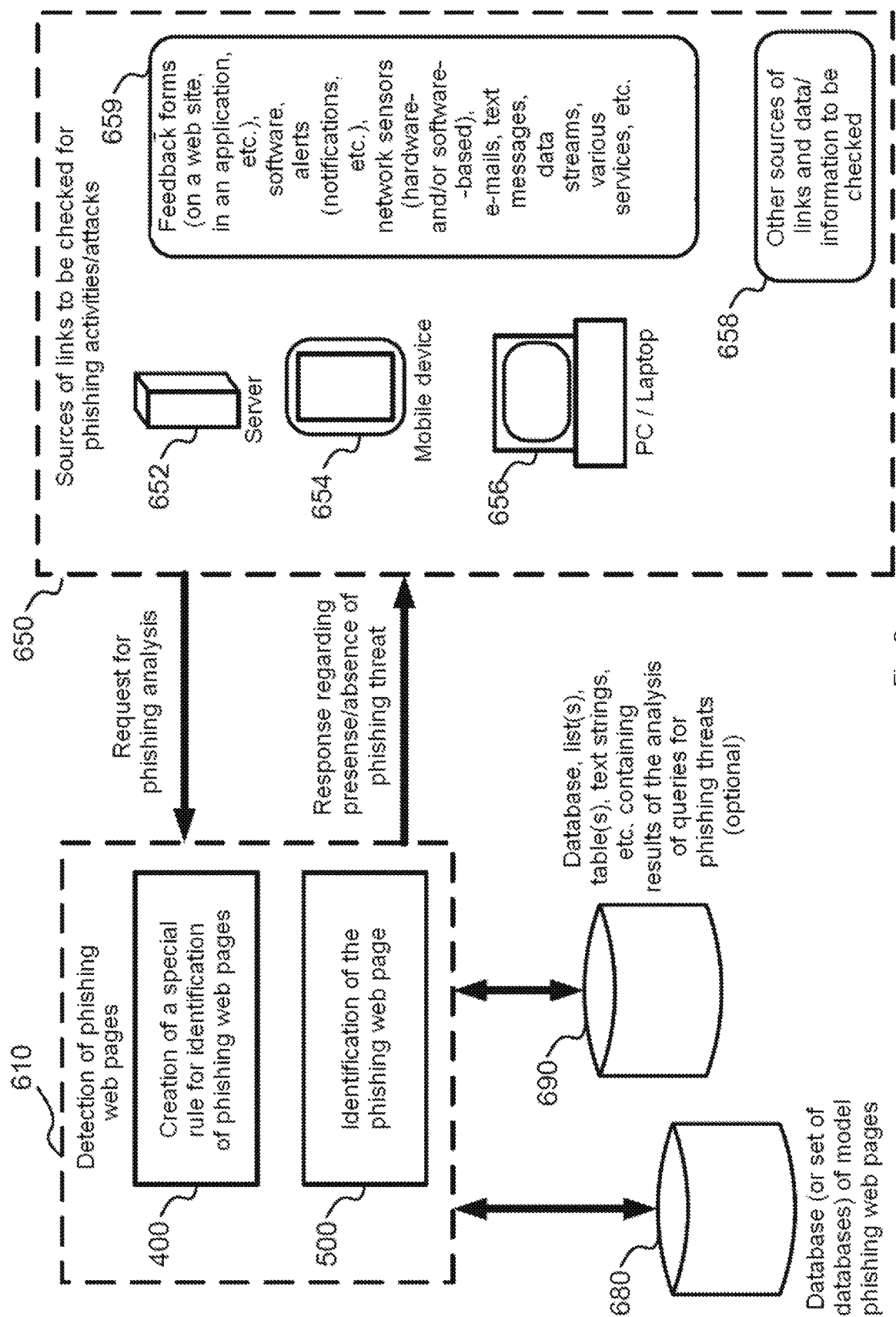
FIG. 6 depicts a schematic diagram of a system and method for identifying phishing resources, in accordance with non-limiting embodiments of the present technology.

FIG. 6 depicts a schematic diagram of a system and method for identifying phishing resources, in accordance with non-limiting embodiments of the present technology.

As seen in FIG. 6, the system for identifying phishing resources comprises a process 610 for detecting phishing resources. The process 610 includes at least one process 400 that creates special rules for identification of phishing resources, and at least one process 500 for identification of phishing resources.

In fact, the processes 400 and 500 may be independent, e.g. some special rules (that result from the process 400) may be already known for a particular phishing resource (a link to which has been obtained, e.g. from the analyzed data source 650). In this case, the embodiment of the system illustrated by FIG. 6 may relate to an identification of phishing resources as shown in FIG. 5. It should be noted that the system shown at FIG. 6 may include no phishing resource identification and may be implemented specifically for creating special rules for phishing resource identification, e.g. to fill a phishing resource database 680 (or several databases, particularly, interconnected ones). In this case, the system shown at FIG. 6 may be an embodiment for creation of a special rule for phishing resource identification as shown in FIG. 4. The special rules may be stored, e.g. in RAM, on a device for storing the source of "phishing queries" (a query for checks for phishing activities, malicious code, etc.), in ROM, EEPROM, on the device that processes the phishing query, or in data storages, such as hard drives, net-based storages, memory cards, etc. that may be connected to those devices and/or computer systems, e.g. in the database 690 and/or 680. The special rules may be used later, when new data (e.g. a web page, or a link to one, etc.) are received and are to be analyzed for possible phishing activities, which relates to the sequence of operations illustrated by FIG. 4 and FIG. 5.

Both processes 400 and 500 may be represented by independent modules, i.e. they may utilize two or more modules rather than be united in a single module 610. For instance, different modules 610 may be used to analyze different types of phishing, phishing aims, brands, etc.

Data sources for creating special rules and/or identifying phishing resources may include servers 652, mobile devices 654, a PC or laptop 656. Data sources may also include feedback forms on web sites or applications (including mobile Android, iOS, etc. applications), notifications from devices or software, including, but not limited to, Firewalls, network sensors, antivirus software, text messages, e-mails, data streams, or various services, such as web services, ad-blockers 659, and other sources of data, links and other information that may or may not be connected to phishing resources 658.

A data source may send/provide data 650 for analysis to the module 610 using its own means or additional means, such as interfaces, systems for exchanging data, data streams, information, messages, links (e.g. URLs) in any conventional form or format (including text formats or interpretations thereof), and in any conventional method.

It should be noted that the process 610 may either be performed by an operator and/or a user, etc., e.g. using software and/or services that are capable of analyzing the data to identify phishing activities, or it may be automated, e.g. with computer systems processing the data with minimum or without any input from the operator. Such systems may include self-learning systems capable of processing the data based on information initially provided by an operator, e.g. initial data or data processing algorithms, as well as creating and storing special rules and results of analysis, including phishing and other fraud-related activities, or malicious code found in the received data.

As mentioned above, the results of analysis may be stored, e.g. in a database 690 and/or 680, in RAM, e.g. of a computer system that is used as a base for performing the phishing analysis, or of a device that has send the analysis query, or of a service that has requested the phishing/malware analysis, or also of devices, services and software that are connected to the devices that take part in requesting the analysis of data for phishing activities in any way. It should be noted that the databases 680 and 690 may be represented by a set of databases that are located on one or several computer devices, data storages, etc. Available data storage formats include, but are not limited to, tables, text documents, data sets, hash tables, B-trees, etc.

It should be noted that said databases may be able to exchange data, including synchronizing data, or completing data in a database with the data from another one (or other ones), all of which may be implemented with additional software, a computing device, and/or common interface.

After a resource has been identified through the process 500, the link source may receive a response, notification, text message, instructions (in the form of machine-executable code or computer instructions), program code, etc. that the analyzed resource is or is not a phishing resource, or that it contains or does not contain malicious code, etc., including the fact of it being or not being connected to other similar fraudulent resources.

It should be noted that such notification may also be sent to the owner of the resource, where some malicious code has been found, e.g. via e-mail that may be located manually or automatically.

Also, the system may send a command (e.g. to the software installed or embedded into the analyzed data source) to block the uploading of content from a suspicious resource, or to block the opening of a web page that has been identified as a phishing web page, etc. For instance, after phishing activity is proven, the resource in question may be added to the databases of an antivirus software, a firewall, or any other software capable of blocking access to resources that have been identified as phishing resources based on the provided information. Also, such response, notification, text message, instructions, Z10 program code may use computer device means or services capable of restricting and/or blocking access to a particular phishing resource for a user, service, or device.

Figure 7:
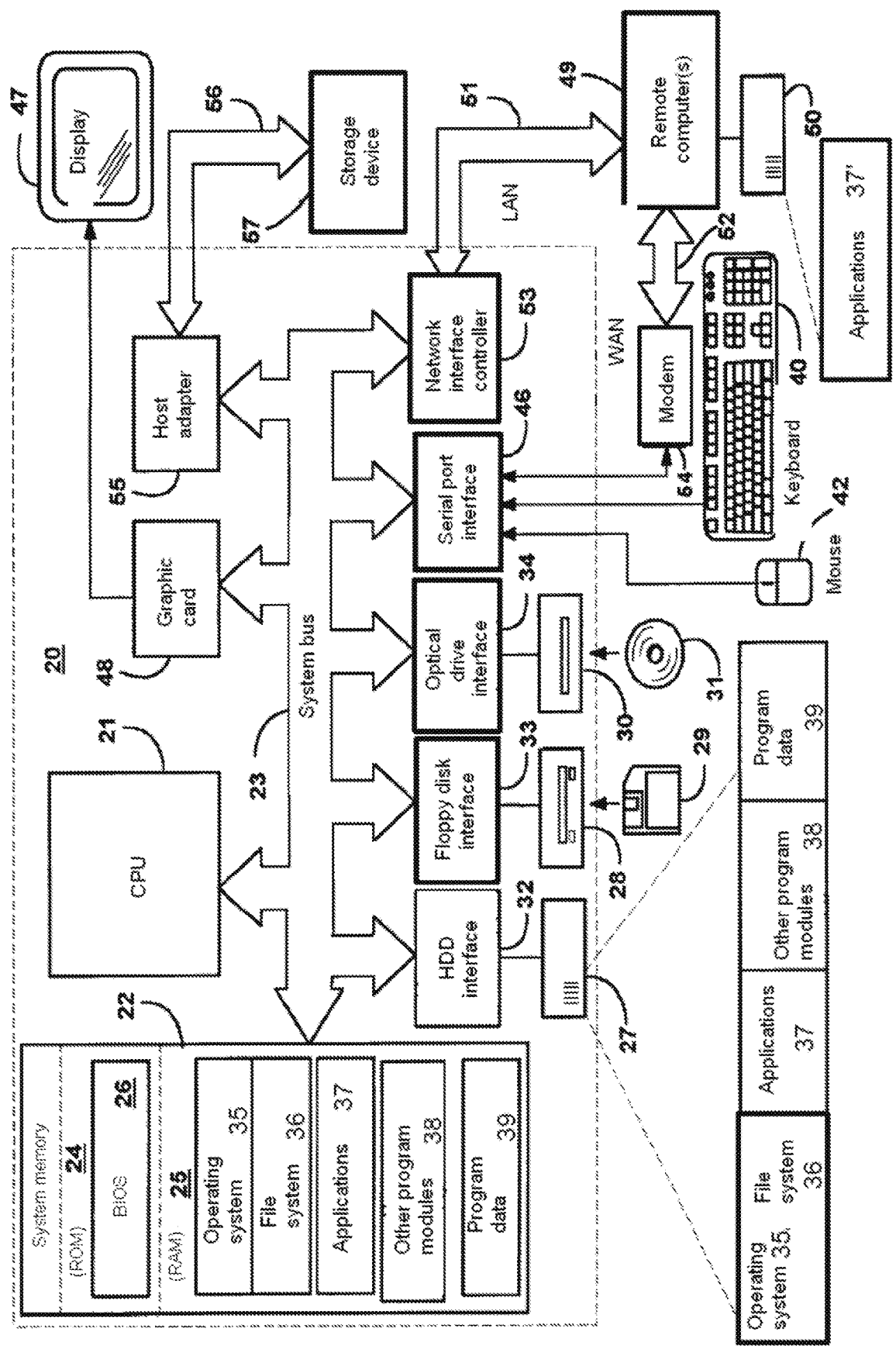
FIG. 7 depicts a schematic diagram of a computer system for identifying phishing resources, in accordance with non-limiting embodiments of the present technology.

FIG. 7 depicts a schematic diagram of a computer system for identifying phishing resources, in accordance with non-limiting embodiments of the present technology. The computer system comprises a multi-purpose computing device—a computer 20 or a server comprising a CPU 21, system memory 22 and system bus 23 that connects various components of the system to each other, particularly, the system memory to the CPU 21.

The system bus 23 may have any structure that comprises a memory bus or memory controller, a periphery bus and a local bus that has any possible architecture. The system memory comprises a ROM (read-only memory) 24 and a RAM (random-access memory) 25. The ROM 24 contains a BIOS (basic input/output system) 26 comprising basic subroutines for data exchanges between elements inside the computer 20, e.g. at startup.

The computer 20 may further comprise a hard disk drive 27 capable of reading and writing data onto a hard disk (not shown), a floppy disk drive 28 capable of reading and writing data onto a removable floppy disk 29, and an optical disk drive 30 capable of reading and writing data onto a removable optical disk 31, such as CD, video CD or other optical storages. The hard disk drive 27, the floppy disk drive 28 and optical disk drive 30 are connected to the system bus 23 via a hard disk drive interface 32, a floppy disk drive interface 33 and an optical disk drive interface 34 correspondingly. Storage drives and their respective computer-readable means allow non-volatile storage of computer-readable instructions, data structures, program modules and other data for the computer 20.

Though the configuration described here that uses a hard disk, a removable floppy disk 29 and a removable optical disk 31 is typical, a person skilled in the art is aware that a typical operating environment may also involve using other machine-readable means capable of storing computer data, such as magnetic tapes, flash drives, digital video disks, Bernoulli cartridges, RAM, ROM, etc.

Various program modules, including an operating system 35, may be stored on a hard disk, a removable floppy disk 29, a removable optical disk 31, in ROM 24 or RAM 25. The computer 20 comprises a file system 36 that is connected to or incorporated into the operating system 35, one or more applications 37, other program modules 38 and program data 39. A user may input instructions and data into the computer 20 using input devices, such as a keyboard 40 or a pointing device 42. Other input devices (not shown) may include microphone, joystick, gamepad, satellite antenna, scanner, etc.

These and other input devices may be connected to the CPU 21 via a serial port interface 46, which is connected to the system bus, but may also be connected via other interfaces, such as parallel port, game port, or USB (universal serial bus). A display 47 or other type of visualization device may be also connected to the system bus 23 via an interface, e.g. a video adapter 48. Additionally to the display 47, personal computers may comprise other peripheral output devices (not shown), such as speakers and printers.

The computer 20 may operate in a network by means of logical connections to one or several remote computers 49. One or several remote computers 49 may be represented as another computer, a server, a router, a network PC, a peering device or another node of a single network, and may comprise the majority of or all elements of the computer 20 as described above, even though only a data storage device 50 is shown at FIG. 7. Logical connections include both LAN (local area network) 51 and WAN (wide area network) 52. Such network environments may be implemented in various institutions, corporate networks, the Intranet and the Internet.

When used in a LAN environment, the computer 20 may be connected to the local area network 51 via a net interface or an adapter 53. When used in a WAN environment, the computer 20 may operate through a modem 54 or other means of establishing connection to the wide area network 52, such as the Internet.

The modem 54 may be an internal or external one, and may be connected to the system bus 23 via a serial port interface 46. In a network environment, program modules or parts thereof as described for the computer 20 may be stored in a remote storage device. It should be noted that the network connections described herein as non-limiting embodiments, and communication between computers may be established through other means.

In conclusion, it should be noted that the details given in the description are examples that do not limit the scope of the present technology as defined by the claims. A person skilled in the art would understand that there may be other embodiments that are consistent with the spirit and scope of the present technology.

What it claimed is:

1. A method for detecting a phishing web page, the method executable by a server, the method comprising:
 executing at a first moment in time:
  receiving, by the server, an indication of a known phishing web page;
  detecting, by the server, at least one unique attribute that allows the server to identify the known phishing web page as a phishing web page;
  analyzing, by the server, the known phishing web page to determine at least one additional unique attribute indicative of the known phishing web page targeting a phishing target web resource;
  generating, by the server, at least one phishing detection rule that is based on the at least one unique attribute and the at least one additional attribute, the at least one phishing rule for determining new phishing web pages based on unique attributes thereof;
  storing, by the server, the at least one phishing detection rule, in a data storage;
 executing at a second moment in time following after the first moment in time:
  receiving, by the server, at least one new web page to be checked for phishing;
  extracting, by the server, the at least one phishing detection rule from the data storage;
  executing, by the server, a code of the at least one new web page and, applying, by the server, the at least one phishing detection rule for analyzing the at least one new web page;

in response to the analyzing rendering a positive outcome:
identifying, by the server, the at least one new web page as a phishing web page;
identifying, by the server, the at least one new web page as targeting the phishing target web resource.

2. The method of claim 1, wherein the receiving, by the server, the at least one new web page to be checked for phishing comprises receiving the at least one new web page, receiving a code of the at least one new page and a code of files linked from the at least one web page.

3. The method of claim 2, wherein the code of the new web page comprises one of an HTML code, a PHP code, a Java script, a CSS code, and a Java applet code.

4. The method of claim 2, wherein the code of files linked from the at least one web page comprises one of HTML code, PHP code, Java script, CSS code, and Java applet code.

5. The method of claim 2, the method further comprising analyzing the code of the at least one new web page and the code of files linked from the at least one web page to determine at least one new unique attribute associated therewith.

6. The method of claim 5, wherein the at least one new unique attribute comprises at least one of: byte sequences, snippets of the code of the at least one new web page, and snippets of the code of files linked from the at least one new web page.

7. The method of claim 6, wherein the method further comprises detecting the at least new unique attribute, the detecting comprising at least one of: analyzing a frequency of byte sequences and analyzing code snippets.

8. The method of claim 1, wherein the at least one phishing detection rule comprises at least one regular expression.

9. The method of claim 1, the method further comprises storing the at least one new web page so-identified as a phishing web page in a phishing web page database.

10. The method of claim 1, wherein the at least one additional unique attribute includes at least one of: a phishing target brand, a brand's official domain, a phishing venue, a phishing object, and a phishing vector.

11. The method of claim 1, wherein in response to a determination of inability to generate the at least one phishing detection rule based on the at least one unique attribute and the at least one additional unique attribute being single attributes, the method further comprising identifying a plurality of unique attributes and wherein the at least one phishing detection rule is generated based on the plurality of unique attributes.

12. The method of claim 1, wherein the data storage is at least one of: a Random Access Memory (RAM) memory, a hard drive disk (HDD), a network-based data storage system, and an online storage.

13. The method of claim 1, wherein the receiving, by the server, the at least one new web page to be checked for phishing comprises receiving the at least one new web page with its contents, the at least one new web page and its contents being defined by an "iframe" floating frame.

14. The method of claim 1, wherein the method further comprises receiving, from an operator, an identification of the at least one unique attribute.

15. The method of claim 1, wherein receiving the known phishing web page comprises receiving the known phishing web page from at least one of: a phishing web page database, a phishing web page link database, a phishing web site, web sites connected with phishing, a user's computer device, network sensors, application event logs, notification systems, e-mails, messaging applications, web services, and a feedback form.

16. The method of claim 1, wherein the method further comprises transmitting, by the server, a notification of the phishing target web resource being under attack to an operator of the phishing target web resource.

* * * * *